US006982507B2

(12) United States Patent
Lin

(10) Patent No.: US 6,982,507 B2
(45) Date of Patent: Jan. 3, 2006

(54) ELECTRIC MOTOR ASSEMBLY WITH A MODULE ATTACHED TO A MOTOR HOUSING

(75) Inventor: Chih Min Lin, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/757,342

(22) Filed: Jan. 14, 2004

(65) Prior Publication Data

US 2005/0151434 A1 Jul. 14, 2005

(51) Int. Cl.
*H02K 11/00* (2006.01)
*H02H 35/10* (2006.01)

(52) U.S. Cl. .................. 310/68 E; 310/112; 310/89; 200/80 R

(58) Field of Classification Search .............. 310/68 A, 310/68 E, 69, 42, 112, 89; 200/80 R
See application file for complete search history.

(56) References Cited

U.S. PATENT DOCUMENTS

| 1,604,497 | A |   | 10/1926 | Stocking |
| 1,750,076 | A |   | 3/1930  | Weichsel |
| 2,670,447 | A |   | 2/1954  | Harmon |
| 2,858,392 | A | * | 10/1958 | Bloser ...................... 200/80 R |
| 2,872,540 | A |   | 2/1959  | Hager |
| 2,897,309 | A |   | 7/1959  | Randol |
| 2,938,975 | A |   | 5/1960  | Williams |
| 2,943,166 | A |   | 6/1960  | May |
| 3,013,132 | A |   | 12/1961 | Merchant |
| 3,532,841 | A |   | 10/1970 | Hackbardt |
| 4,205,245 | A |   | 5/1980  | Hildebrandt et al. |
| 4,250,359 | A |   | 2/1981  | Gdovichin |
| 4,334,161 | A |   | 6/1982  | Carli |
| 4,395,668 | A |   | 7/1983  | Komatsu |
| 5,291,086 | A |   | 3/1994  | Shekalim |
| 6,710,271 | B2 | * | 3/2004 | Spedale et al. ........... 200/80 R |

* cited by examiner

*Primary Examiner*—Burton Mullins
(74) *Attorney, Agent, or Firm*—Michael Best & Friedrich LLP

(57) ABSTRACT

An electric motor assembly including a mechanism for mounting a module housing end on a motor housing end, and a mechanism for drivingly connecting a module shaft end to a motor shaft end. The assembly further includes a mechanism for preventing the module housing from rotating relative to the motor housing, and a mechanism for slidably attaching for shaft axis direction movement relative to each other the module housing and the motor housing. The module shaft end and the motor shaft end are located relative to their respective housings so that they can be drivingly connected to each other without the module housing and the motor housing interfering with the connection.

11 Claims, 2 Drawing Sheets

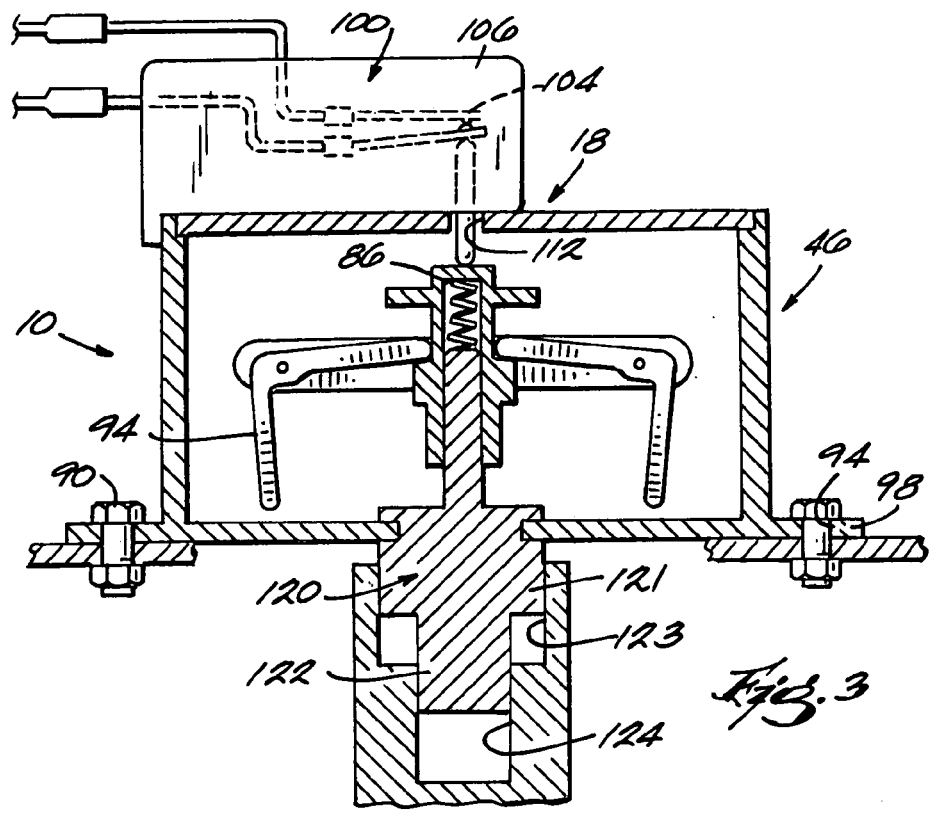
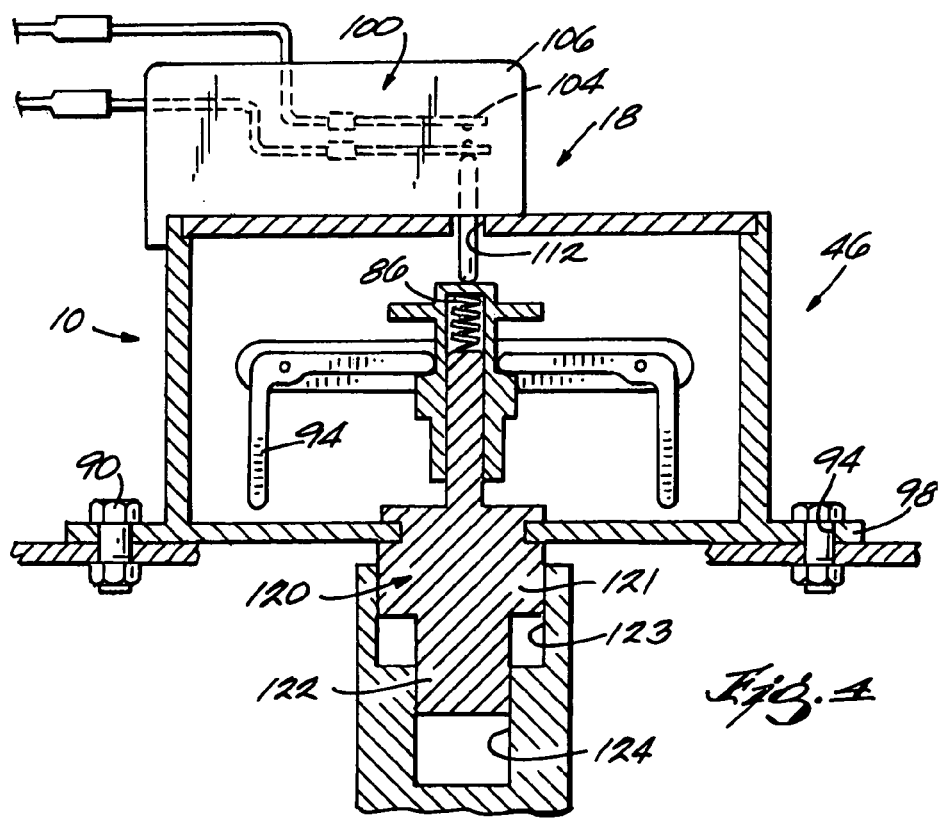

US 6,982,507 B2

ELECTRIC MOTOR ASSEMBLY WITH A MODULE ATTACHED TO A MOTOR HOUSING

BACKGROUND OF THE INVENTION

This invention relates to electric motors and modules attached to electric motors, and, more particularly, to governor and switch assembly modules used with electric motors.

A conventional induction motor uses a governor and a switch to disengage the starting capacitor or starting phase winding at a pre-selected speed. In a typical two compartment motor design, the governor is mounted on a motor shaft and the switch is mounted to a motor housing or frame. In order to compensate for the large stack-up tolerances of the parts in the motor assembly, and to provide the necessary snap action, both the governor and the switch have fairly large mass and size. Extensive labor is required for assembly and adjusting the governor and switch.

SUMMARY OF THE INVENTION

One of the principal objects of the invention is to provide an electric motor with governor and switch where the relative position of the governor and switch is predefined by a precision molded housing, with no adjustment required.

Another of the principal objects of the invention is to provide an electric motor with a governor and a switch where the switch and the governor reside in the same integral module, and the position of the governor relative to the switch is independent of the relative position between the rotor assembly and the end of the motor housing.

Another of the principal objects of the invention is to provide an electric motor with a governor and a switch where the module can be easily attached to the motor housing.

Another of the principal objects of the invention is to provide an electric motor with a governor and a switch where the switch and the governor are totally enclosed, eliminating the possibility of being damaged by anything inside the motor housing.

More particularly, this invention provides an electric motor assembly including a mechanism for mounting a module housing end on a motor housing end, and a mechanism for drivingly connecting a module shaft end to a motor shaft end. The assembly further includes a mechanism for preventing the module housing from rotating relative to the motor housing, and a mechanism for slidably attaching for shaft axis direction movement relative to each other the module housing and the motor housing. The module shaft end and the motor shaft end are located relative to their respective housings so that they can be drivingly connected to each other without the module housing and the motor housing interfering with the connection.

BRIEF DESCRIPTION OF THE DRAWINGS

FIG. 3 is a cross sectional view, partially broken away, of the end of the electric motor with a module similar to what is shown in FIG. 1, only the module is attached to the motor with another embodiment of the invention.

FIG. 4 is a view similar to FIG. 3, only illustrating the governor in the switch open position.

Figure 1:
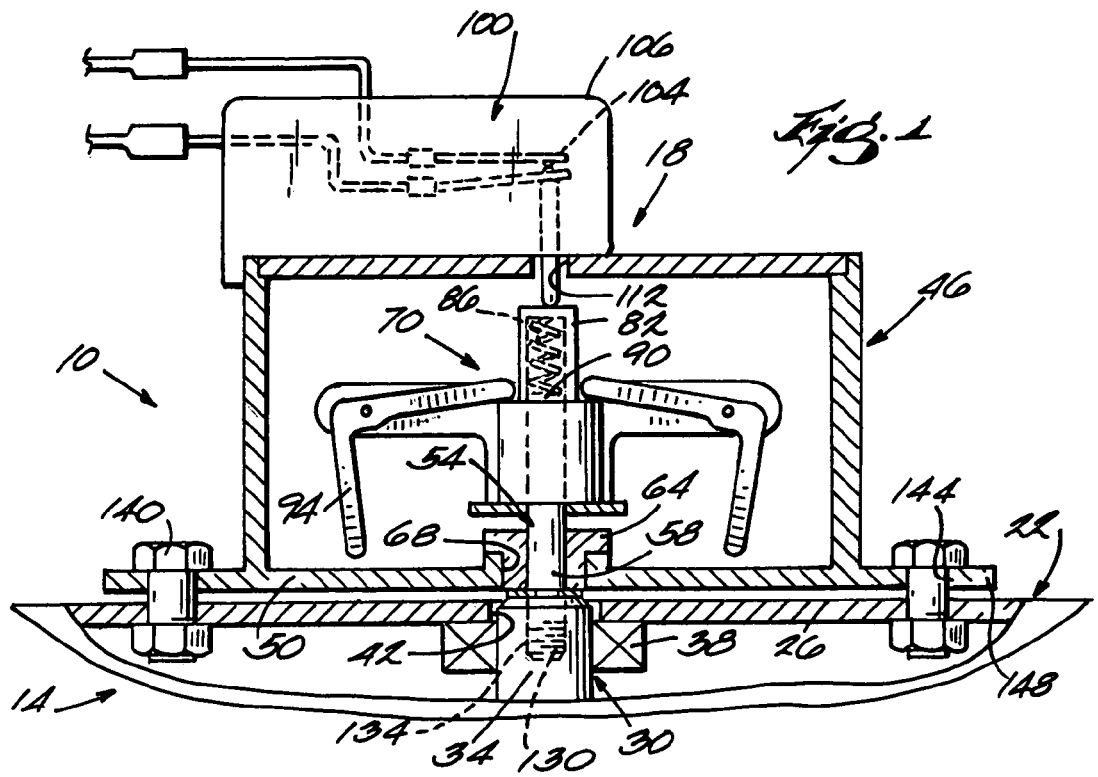
FIG. 1 is a cross sectional view, partially broken away, of an end of an electric motor with a module attached to the motor, the module including a governor attached to a motor shaft and a snap switch.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

Figure 2:
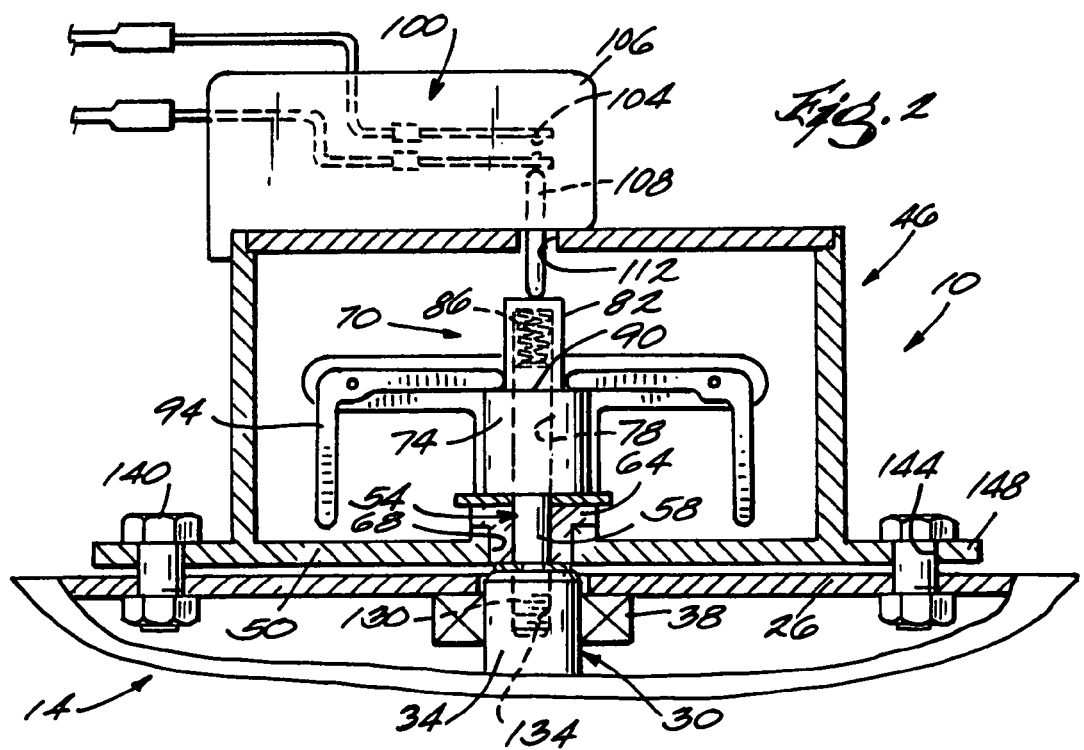
FIG. 2 is a view similar to FIG. 1, only illustrating the governor in the switch open position.

As illustrated in FIGS. 1 through 4, and especially FIGS. 1 and 2, the invention comprises an electric motor assembly 10 including an electric motor 14 and a module 18. The electric motor 14 includes a motor housing 22 having an end 26, and a motor shaft 30 having an end 34 adjacent the motor housing end 26. The electric motor 14 further includes means in the form of bearings 38 in the motor housing 22 for rotatably mounting the motor shaft 30 in the motor housing 22. In other embodiments, other means for mounting the motor shaft 30 in the motor housing 22 can be used. The orientation of the motor shaft 30 defines a motor shaft axis direction. The electric motor 14 also includes an opening 42 in the motor housing 22. The opening 42 provides access from outside of the motor 14 to the motor shaft end 34.

The module 18 includes a module housing 46 having an end 50, and a module shaft 54 having an end 58 adjacent the module housing end 50. The module 18 further includes means in the form of bearings 64 in the module housing 46 for rotatably mounting the module shaft 54 in the module housing 46. The orientation of the module shaft 54 defines a module shaft axis direction. The module 18 also includes an opening 68 in the module housing 46. The opening 68 provides access from outside of the module 18 to the module shaft end 58.

The module 18 includes a governor 70, and the governor 70 includes a central governor mount 74 having a central bore 78 that receives the module shaft 54. The governor 70 also includes a spring housing 82 coaxial with the governor mount central bore 78, and a spring 86 in the spring housing 82 and between an end 90 of the module shaft 54 and the spring housing 82. The governor 70 also includes two L-shaped governor arms 94 pivotally mounted on opposite sides of the governor mount 74. As the governor mount 74 spins faster, one part of the L-shaped arms 94 moves radially outward and pivots the arms 94, and the other part of L-shaped arm 94 presses the governor mount 74 away from the spring housing 82 and along the module shaft 54.

The module 18 also includes a snap switch 100. The snap switch 100 is attached to the module housing 46 and includes two contacts 104 mounted in a housing 106 attached to the module housing 46. The contacts 104 are normally biased to an open position. The snap switch 100 also includes a switch arm 108 adjacent the contacts 104 so that, when the arm 108 is moved toward the contacts 104, the arm 108 closes the contacts 104. The switch arm 108 is in contact with the spring housing 82 and extends into the module housing 46 through an opening 112.

The electric motor assembly 10 further includes means for drivingly connecting the module shaft end 58 to the motor shaft end 34, means for preventing the module housing 46 from rotating relative to the motor housing 22, and means for slidably attaching for shaft axis direction movement relative to each other the module housing 46 and the motor housing 22. The module shaft end 58 and the motor shaft end 34 are located relative to their respective housings so that they can be drivingly connected to each other without the module housing 46 and the motor housing 22 interfering with the connection.

Securely attaching the module shaft 54 to the motor shaft 30 without being concerned about interference between the module housing 46 and the motor housing 22 is a significant advance over the art. This eliminates the need to add additional labor to the motor assembly 10 by attempting to compensate for manufacturing tolerances that would otherwise build up and interfere with the relative position of the motor shaft 30 and the module shaft 54 that in turn determine the relative position of the governor mount 74 and the switch arm 108.

The above description is descriptive of both of the embodiments of the invention shown in FIGS. 1 through 4.

In the preferred embodiment of the invention, as illustrated in FIGS. 3 and 4, the means for drivingly connecting the module shaft end 58 to the motor shaft end 34 and for the means for slidably attaching for shaft axis direction movement relative to each of the module 18 and the motor 14 comprises a keyed end 120 in one of the module shaft and the motor shaft ends, and a mating keyed opening 124 in the other of the module shaft and the motor shaft ends. More particularly, in the preferred embodiment, the keyed end 120 is in the module shaft 54, and the keyed opening 124 is on the motor shaft 30. Still more particularly, the keyed end 120 has a flat 121 received in a mating slot 123 in the keyed opening 124 in order to transmit torque from the motor shaft 30 to the module shaft 54. In other embodiments, a hexed key (not shown) or other comparable structure can be used. Clearance is provided in the axis direction between the keyed end 120 and the key opening 124 to allow for variance in the relative position of the module shaft end 58 and the motor shaft end 34.

Still more particularly, in the preferred embodiment, the means for mounting the module housing end 58 on the motor housing end 22 and the means for preventing the module housing 46 from rotating relative to the motor housing 22 comprises means fixedly attaching the module housing end 50 on the motor housing end 26. In other embodiments (not shown), the module housing 46 can be part of the motor housing 22 when the means for slidably attaching the module shaft end and the motor shaft end is as shown in this embodiment.

More particularly, the means fixedly attaching the module housing end 50 on the motor housing end 26 comprises attaching the module housing end 50 on the motor housing end 26 with a bolt 90 held in an opening 94 in a tab 98 extending from the module housing 46 and fixed to the motor housing 22. More particularly, there are two of such tabs and bolts, each on an opposite side of the module housing 46. The module housing end 50 can not rotate because the bolts 90 are fixed to the motor housing 22 and the bolts 90 are received in the openings 94 in the module housing 46.

In an alternate embodiment, as shown in FIGS. 1 and 2, the means for drivingly connecting the module shaft end 58 to the motor shaft end 34 and the means for mounting the module housing end 50 on the motor housing end 26 comprises a threaded end 130 in one of the module shaft and the motor shaft ends, and a threaded opening 134 in the other of the module shaft and the motor shaft ends. More particularly, in the preferred embodiment, the threaded end is in the module shaft 54, and the threaded opening is on the motor shaft 30.

Still more particularly, in the alternate embodiment, the means for preventing the module housing 46 from rotating relative to the motor housing 22 and the means for slidably attaching for shaft axis direction movement relative to each other the module housing and the motor housing comprises means for slidably attaching for shaft axis direction movement relative to each other the module housing end 50 on the motor housing end 26.

In this embodiment, this means for slidably attaching the module housing end 50 on the motor housing end 26 comprises a post in the form of a bolt 140 on one of the module housing 46 and the motor housing 22 and a mating indentation 144 on the other of the module housing 46 and the motor housing 22. More particularly, in this embodiment, the bolt 140 is slidably held in the opening 144 in a tab 148 extending from the module housing 46. Still more particularly, there are two of such tabs and bolts, each on an opposite side of the module housing 46. Clearance is provided in the axis direction between the module housing end 50 and the motor housing end 26 to allow for variance in the relative position of the module shaft end 58 and the motor shaft end 34. Accordingly, the module housing 46 can move relative to the motor housing 22 because the module housing end 50 can slide on the bolts 140, but can not rotate because the bolts 140 are fixed to the motor housing 22 and the bolts 140 are received in the openings 144 in the module housing 46.

Various other features and advantages of the invention will be apparent from the following claims.

What is claimed is:

1. An electric motor comprising:
    a motor housing;
    a rotor coupled to the motor housing and supported for rotation about a motor shaft axis that defines an axial direction;
    a module housing coupled to the motor housing and movable in the axial direction with respect to the motor housing; and
    a governor including a module shaft coupled to the rotor for rotation, the governor disposed substantially within the module housing, wherein the module shaft is threadably engaged with the motor rotor.

2. The electric motor of claim 1, further comprising a switch disposed within a switch housing separate from the module housing, the switch housing coupled to the module housing.

3. An electric motor assembly including
    a motor housing having an end,
    a motor shaft having an end adjacent said motor housing end,
    means for rotatably mounting said motor shaft in said motor housing, the orientation of the motor shaft defining a motor shaft axis direction,
    an opening in said motor housing that provides access to said motor shaft end from outside said motor housing,
    a module housing having an end,
    a module shaft having an end adjacent said module housing end, means for rotatably mounting said module shaft in said module housing in said shaft axis direction, an opening in said module housing that provides access to said module shaft end from outside said module housing, means for mounting said module housing end on said motor housing end, means for drivingly connecting said module shaft end to said motor shaft end, means for preventing said module housing from rotating relative to said motor housing, means for slidably attaching for shaft axis direction movement relative to each other said module housing and said motor housing, said module shaft end and said motor shaft end being located relative to their respective housings so that they can be drivingly connected to each other without the module housing and the motor housing interfering with the connection, wherein said means for drivingly connecting said module shaft end to said motor shaft end and for said means for slidably attaching for shaft axis direction movement relative to each other said module housing and said motor housing comprises a keyed end in one of said module shaft and said motor shaft ends, and a mating keyed opening in said other of said module shaft and said motor shaft ends.

4. An electric motor in accordance with claim 1 wherein said means for mounting said module housing end on said motor housing end and said means for preventing said module housing from rotating relative to said motor housing comprises means fixedly attaching said module housing end on said motor housing end.

5. An electric motor in accordance with claim 1 wherein said module includes a governor, said governor including a central governor mount having a central bore that receives said module shaft, a spring housing coaxial with said governor mount central bore, a spring in said spring housing and between an end of said module shaft and said spring housing, and two L-shaped governor arms pivotally mounted on opposite sides of said governor mount so that as said governor mount spins faster, one part of said L-shaped arms moves radially outward and pivots said arms and said other part of L-shaped arm presses the governor mount away from said spring housing along said module shaft.

6. An electric motor in accordance with claim 1 wherein said module further includes a snap switch, said snap switch being attached to said module housing and including two contacts biased to an open position, and a switch arm adjacent said contacts so that, when said arm is moved toward said contacts, said arm closes said contacts, said switch arm being in contact with said governor mount and extending into said module housing.

7. An electric motor assembly including
a motor housing having an end,
a motor shaft having an end adjacent said motor housing end,
means for rotatably mounting said motor shaft in said motor housing, the orientation of the motor shaft defining a motor shaft axis direction,
an opening in said motor housing that provides access to said motor shaft end from outside said motor housing,
a module housing having an end,
a module shaft having an end adjacent said module housing end, means for rotatably mounting said module shaft in said module housing in said shaft axis direction, an opening in said module housing that provides access to said module shaft end from outside said module housing, means for mounting said module housing end on said motor housing end, means for drivingly connecting said module shaft end to said motor shaft end, means for preventing said module housing from rotating relative to said motor housing, means for slidably attaching for shaft axis direction movement relative to each other said module housing and said motor housing, said module shaft end and said motor shaft end being located relative to their respective housings so that they can be drivingly connected to each other without the module housing and the motor housing interfering with the connection, wherein said means for drivingly connecting said module shaft end to said motor shaft end and said means for mounting said module housing end on said motor housing end comprises a threaded end in one of said module shaft and said motor shaft ends, and a threaded opening in said other of said module shaft and said motor shaft ends.

8. An electric motor in accordance with claim 7 wherein said means for preventing said module housing from rotating relative to said motor housing and said means for slidably attaching for shaft axis direction movement relative to each other said module housing and said motor housing comprises means for slidably attaching for shaft axis direction movement relative to each other said module housing end on said motor housing end.

9. An electric motor in accordance with claim 8 wherein said means for slidably attaching said module housing end on said motor housing end comprises a post on one of said module housing and said motor housing and a mating indentation on the other of said module housing and said motor housing.

10. An electric motor in accordance with claim 7 wherein said module further includes a snap switch, said snap switch being attached to said module housing and including two contacts biased to an open position, and a switch arm adjacent said contacts so that, when said arm is moved toward said contacts, said arm closes said contacts, said switch arm being in contact with said governor mount and extending into said module housing.

11. An electric motor in accordance with claim 7 wherein said module includes a governor, said governor including a central governor mount having a central bore that receives said module shaft, a spring housing coaxial with said governor mount central bore, a spring in said spring housing and between an end of said module shaft and said spring housing, and two L-shaped governor arms pivotally mounted on opposite sides of said governor mount so that as said governor mount spins faster, one part of said L-shaped arms moves radially outward and pivots said arms and said other part of L-shaped arm presses the governor mount away from said spring housing along said module shaft.

* * * * *